July 7, 1964     J. P. TRIES ETAL     3,139,643
WINDSHIELD CLEANER
Filed Nov. 22, 1961
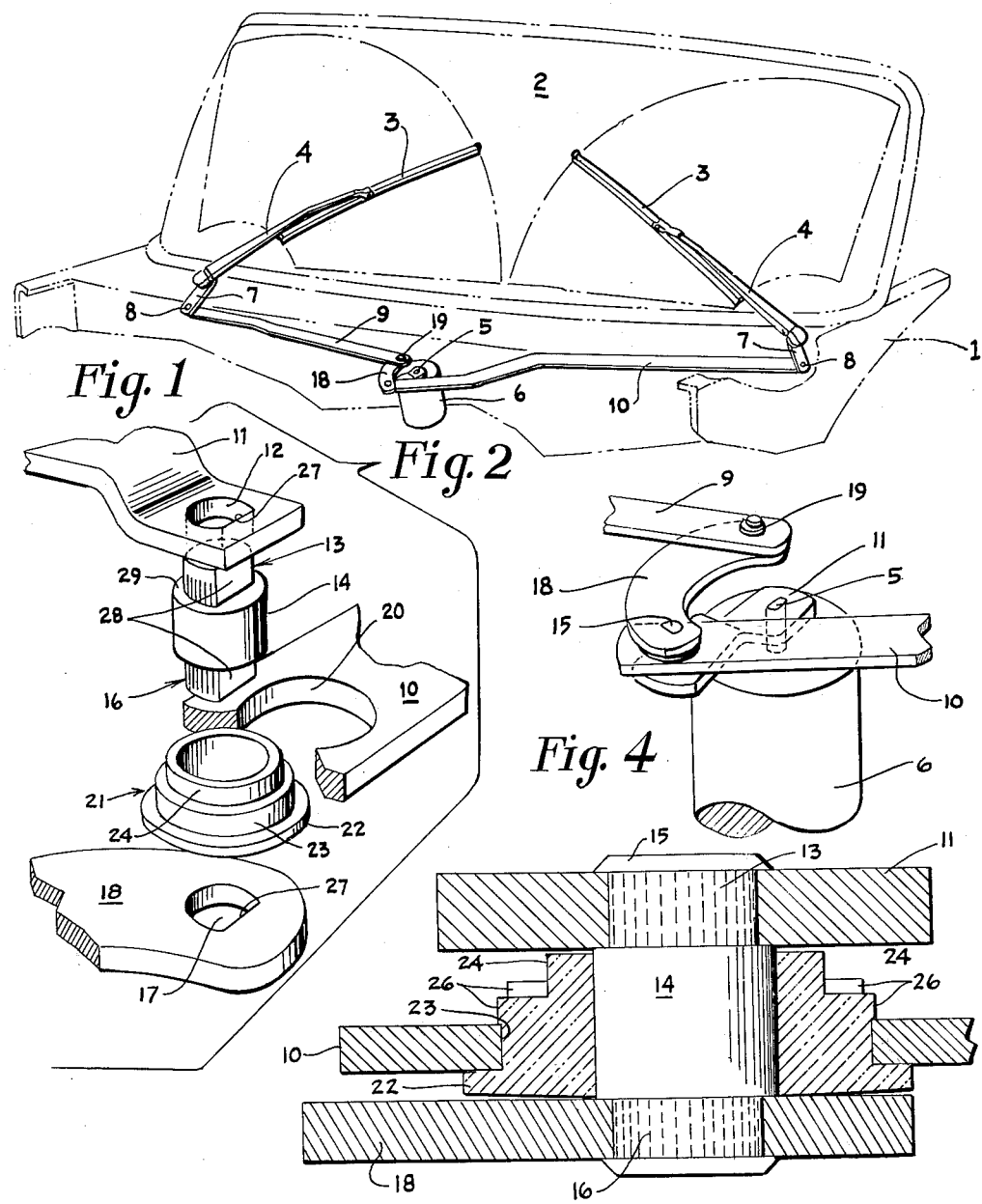
INVENTORS
JOSEPH P. TRIES and
JAMES R. BLEWETT
BY Bean, Brooks, Buckley & Bean.
ATTORNEYS.

United States Patent Office 3,139,643
Patented July 7, 1964

3,139,643
WINDSHIELD CLEANER
Joseph P. Tries, Buffalo, and James R. Blewett, East Amherst, N.Y., assignors to Trico Products Corporation, Buffalo, N.Y.
Filed Nov. 22, 1961, Ser. No. 154,247
3 Claims. (Cl. 15—250.27)

This invention relates to the windshield cleaning art and more particularly to an improved and simplified mechanism for oscillating the wiper blades, the invention residing in a unique construction of economical design that will facilitate and expedite the assembly of its transmission linkage and its installation on a motor vehicle.

The primary object and purpose of the invention is to provide for efficiency in manufacture and performance through an economical arrangement of press-fitted elements that afford an ideal mechanical action for carrying the dual wiper load of the present-day motor vehicle to effectively and satisfactorily maintain a wide field of vision through its curved windshield.

The dual wiper installation of the present invention embodies oscillating wiper arms that are fixed to laterally spaced pivot shafts each equipped with a rocker arm that is coupled through its own connecting rod to the power unit, such as an electric motor. The power unit is so designed as to admirably adapt it for mass production through a press-fitting operation, the construction acting to guide in an accurately assembled windshield cleaner mechanism with a minimum of expense. More particularly, the invention resides in the unique manner by which the driving crank means of the transmission cooperate with the connecting rods to the wipers to secure a lasting and durable press-fitted arrangement for cleaning the curved windshields of today through the oscillatory movement to the wipers.

In accordance with the present invention the fixed securement of each connecting rod to its driving crank is accomplished in a unique manner to assure the wipers having a definite path of movement on the windshield relative to each other and for properly parking them when not in use.

In the present invention a double ended rivet-like stud member is used to connect the elongated links or connecting rods for a wiper set to the crank mechanism of the motor. The specific invention resides in having the opposite ends or studs of the above-mentioned rivet-like stud members with a circular portion which is knurled and a flat portion which is not knurled. The studs are pressed into the links having substantially mating apertures. The flat portions of the studs prevent relative rotation of the studs in the link apertures. The knurled portion prevents minute movement between the ends of the stud member and the links, which movement might result in unduly enlarging the apertures in the links into which the studs fit. In other words, by the use of a combination of a knurled surface and a flat surface no movement between the stud member and the links is permitted, whereas if the knurled portion were not used, there would be a slight amount of relative movement which would ultimately result in undesirable looseness between the studs and the links. It can readily be appreciated that the foregoing construction obviates any possibility of any looseness in the linkages which may be magnified because of the oscillatory motion to which such linkages are subjected thereby resulting that the linkages will give smooth, quiet operation throughout the life thereof. Furthermore, the improved fabrication definitely and accurately anchors the parts of the crank action in a predetermined relationship for a longer period of usefulness and efficiency.

The foregoing and other objects will manifest themselves as the following description progresses, reference being had to the accompanying drawing wherein:

FIG. 1 is a fragmentary view of a motor vehicle in phantom and depicting the improved windshield cleaner mechanism in full lines as installed therein;

FIG. 2 is an inverted and exploded view, in perspective, of the transmission double throw crank action;

FIG. 3 is an inverted sectional view through the assembled crank action; and

FIG. 4 is a fragmentary plan view of the double throw crank action of the transmission linkage.

Referring more particularly to the drawing, the numeral 1 designates a motor vehicle with a windshield 2 over which is oscillated a pair of wipers 3 carried by their actuating arms 4 and, in turn, driven through a novel transmission from the rotating power shaft 5 of a motor 6. The wiper arms are mounted on their usual pivot shafts that have fixed rocker arms 7 pivotally connected at 8 to the outer ends of the respective connecting rods or links 9 and 10, the inner ends of the connecting rods having power applied to the wipers through a unique double throw crank action.

In accordance with the present invention, the unique double throw crank action has a drive arm or link 11 formed in its outer end with an opening or recess 12 to receive a stud 13 on one end of a crank pin or shaft 14 where it is fixed, as by a press fit and additionally by being peened or swaged over, as indicated at 15. In cross section, the stud 13 is of irregular shape and the opening 12 is likewise shaped for mating reception of the stud thereby to fixedly secure the parts against relative rotation. The opposite end of the crank pin is formed with a stud 16 to fit a mating opening or recess 17 in a crank arm 18 to rigidly connect it to the crank 14. The crank arm carries a crank pin 19 on which the connecting rod 9 has a driving bearing for imparting reciprocating action to its wiper. Thus, both crank pins constitute a double throw crank action or assembly to actuate the wipers in synchronism though in an out-of-phase relation.

The crank pin 14 is journaled in an opening 20 formed in the inner end of the connecting rod 10. To minimize the friction in this driving connection, a journal bushing 21 is interposed between the crank pin 14 and the margin of the opening 20. The bushing is shown as having a basal flange 22, a hub 23 that finds support in the opening 20, and a hub extension 24 that spaces the drive arm 11 from the connecting rod 10. The underface of the basal flange may have a taper 25 to facilitate the introduction of lubricant into the journal bearing 21, and, to facilitate the assembly of this crank unit, the bushing may be affixed to the connecting rod 10 by staking or upsetting the end of the hub 23 at intervals, as at 26, to bind upon the margin of the opening 20.

When fabricating or assembling the crank action, the studs 13 and 16 and their receiving openings 12 and 17 are given an irregular shape to guide the placement of the parts and to insure accuracy in relating the drive arm to both crank pins. To this end and by way of example, the irregular openings are D-shaped to afford in each a flat face 27 to abut the respective one of the parallel faces 28 on the reduced studs 13 and 16. In addition thereto, the peripheral portions of the studs are fluted or knurled to bite into the corresponding rounded walls of the openings through a press-fit. The larger flat face of each stud will determine the relative placement of the parts for accuracy in operation and also provide abutment means to prevent relative rotation of the fitted parts while the fluted securement will resist minor displacement. Furthermore, it will be noted that each stud has a flat abutment face which determines the position and when press-fitted will slide on the flat face in the opening whereas the fluted portion will cut and locate its seat as guided by the abutment face. The studs 13 and 16 are reduced in diameter to provide base shoulders 29 to limit the press-fitting operations.

In operation, the double throw crank action will impart reciprocatory motion to the connecting rod 10 through the crank pin 14 and a like motion to the companion connecting rod 9 through the crank pin 19. Both crank pins will orbit in unison about the axis of the power shaft, but by reason of the arm 18 of the rod 9 the crank pin 19 is placed opposite crank pin 14 across center, to rock its wiper in opposition to the companion wiper with an action sometimes referred to as a "clap hand" motion. The means for predetermining the accurate interrelation or placement of the crank pins will also serve in effecting accurate replacement of one or more parts.

The transmission linkage is of inexpensive design in that the accurate assemblage of its components is assured by reason of their construction, and while the foregoing description has been given in detail for clearness and ease of understanding, it is not intended thereby to limit the invention since the inventive principles involved are capable of assuming other physical embodiments without departing from the spirit of the invention and the scope of the appended claims.

What is claimed is:

1. In windshield cleaning apparatus comprising a wiper, a rotating drive shaft provided with an outstanding arm, transmission means operatively connecting the shaft to the wiper for operating the latter; said transmission means including a crank pin with an axially extending stud on each end and a rod bearing intermediate its ends, said rod bearing being of greater diameter than each of said studs forming a radially extending circumferential shoulder intermediate each of said studs and said rod bearing, each stud having a fluted peripheral portion and a single flat face, a second arm, said two arms formed with openings to matchingly receive the two studs and thereby predetermine the correct interplacement of the two arms and a connecting rod having at one end journal support on the rod bearing of the crank pin and means for connecting said connecting rod to a wiper at its other end.

2. In windshield cleaning apparatus comprising a wiper, a rotating drive shaft provided with an outstanding arm, transmission means operatively connecting the shaft to the wiper for operating the latter; said transmission means including a crank pin with an axially extending stud on each end and a rod bearing intermediate its ends, said rod bearing being of greater diameter than each of said studs forming a radially extending shoulder intermediate each of said studs and said rod bearing, each stud having a fluted peripheral portion and a single flat face, a second arm, said two arms formed with openings to matchingly receive the two studs and to thereby predetermine the correct interplacement of the two arms and a connecting rod having at one end journal support on the rod bearing of the crank pin and means for connecting said connecting rod to a wiper at its other end.

3. In windshield cleaning apparatus comprising a wiper, a rotating drive shaft provided with an outstanding arm, transmission means operatively connecting the shaft to the wiper for operating the latter; said transmission means including a crank pin with an axially extending stud on each end and a rod bearing intermediate its ends, said rod bearing being of greater diameter than each of said studs forming a radially extending shoulder intermediate each of said studs and said rod bearing, each stud having a fluted peripheral portion and being non symmetrical in cross section, a second arm, said two arms formed with openings to matchingly receive the two studs and thereby predetermine the correct interplacement of the two arms and a connecting rod having at one end journal support on the rod bearing of the crank pin and means for connecting said connecting rod to a wiper at its other end.

References Cited in the file of this patent

UNITED STATES PATENTS

| | | |
|---|---|---|
| 2,768,530 | Brundage | Oct. 30, 1956 |
| 2,836,841 | Oishei | June 3, 1958 |
| 3,025,552 | Contant | Mar. 20, 1962 |